(12) United States Patent
Allen et al.

(10) Patent No.: US 7,089,587 B2
(45) Date of Patent: Aug. 8, 2006

(54) ISCSI TARGET OFFLOAD ADMINISTRATOR

(75) Inventors: James P. Allen, Austin, TX (US); William Christopher Conklin, Georgetown, TX (US); Vinit Jain, Austin, TX (US); Shawn Patrick Mullen, Buda, TX (US); Rakesh Sharma, Austin, TX (US); Satya Prakash Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 10/116,523

(22) Filed: Apr. 4, 2002

(65) Prior Publication Data
US 2003/0191932 A1  Oct. 9, 2003

(51) Int. Cl.
H04L 9/00 (2006.01)
H04K 1/00 (2006.01)
G06F 13/00 (2006.01)

(52) U.S. Cl. .............. 726/14; 713/151; 713/171; 719/326

(58) Field of Classification Search .................. None
See application file for complete search history.

(56) References Cited

U.S. PATENT DOCUMENTS

| | | | |
|---|---|---|---|
| 6,845,403 B1* | 1/2005 | Chadalapaka | 710/5 |
| 2002/0103887 A1* | 8/2002 | Bagasrawala | 709/223 |
| 2003/0115447 A1* | 6/2003 | Pham et al. | 713/153 |
| 2003/0177174 A1* | 9/2003 | Allen et al. | 709/203 |
| 2005/0125654 A1* | 6/2005 | Spry et al. | 713/151 |
| 2005/0138418 A1* | 6/2005 | Spry et al. | 713/201 |
| 2005/0149748 A1* | 7/2005 | Spry et al. | 713/200 |

OTHER PUBLICATIONS

Tang et al, "Performance Study of Software-Based iSCSI Security", 2003, Proceedings of the First International IEEE Security in Storage Workshop, p. 1-10.*
Kent et al, "Security Architecture fo the Internet Protocol", Nov. 1998, Network Working Group Request for Comments: 2401, p. 1-66.*
Harkins et al, "The Internet Key Exchange", Nov. 1998, Network Working Group Request for Comments: 2409, p. 1-41.*
Krueger et al, "Small Computer Systems Interface Protocol Over the Internet Requirements and Design Considerations", Jul. 2002, Network Working Group Request for Comments: 3347, p. 1-26.*

* cited by examiner

*Primary Examiner*—Christopher Revak
(74) *Attorney, Agent, or Firm*—Volel Emile; Mark E. McBurney; Thomas E. Tyson

(57) ABSTRACT

A method, system and apparatus for negotiating parameters for an IPSec connection between a requesting client and an iSCSI system using a computer system other than an iSCSI system are provided. By design, the iSCSI system monitors TCP (Transmission Control protocol) port 500 for secure requests. When a request enters port 500, the iSCSI system transmits all information received on port 500 to a computer system better suited to handle IPSec parameter negotiations. After the computer system has negotiated the parameters, the parameters are passed to the iSCSI system for a secure data transaction to ensue.

20 Claims, 6 Drawing Sheets

ISCSI TARGET OFFLOAD ADMINISTRATOR

BACKGROUND OF THE INVENTION

1. Technical Field

The present invention is directed to communications networks. More specifically, the present invention is directed to a method and apparatus for providing security to iSCSI data transaction.

2. Description of Related Art

Data storage is an essential part of any company's infrastructure. Rapidly increasing storage capacities and network speeds challenge storage system performance, whether it is at the enterprise level or below. IP storage addresses the requirements of a range of environments from single server to computer room, Internet data center, campus and WAN (wide area network).

IP storage, known as iSCSI, is a new emerging technology. ISCSI allows requests for data, transmission and reception of data over the Internet. ISCSI lets a corporate network transfer and store SCSI commands and data to any location with access to the WAN or the Internet.

As is well known, SCSI is a commonly used industry standard protocol for storage devices. Using the SCSI protocol, drive control commands and data are sent to the drives. Responses and status messages, as well as data read from the devices, are passed through SCSI controllers. In a system supporting iSCSI, a user or software application issues a command to store or retrieve data on a SCSI storage device. The request is processed by the operating system and is converted to one or more SCSI commands and data request. Both data SCSI commands and request go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

An iSCSI session begins with an iSCSI initiator (a client) connecting to an iSCSI target (typically, using TCP) and performing an iSCSI login. The login creates a persistent state between initiator and target, which may include initiator and target authentication, session security certificates, and session option parameters. Once the login is successfully completed, the iSCSI initiator may issue SCSI commands encapsulated by the iSCSI protocol over its TCP connection to be executed by the iSCSI target.

Thus, a login provides an opportunity for an initiator and target to setup an Internet Protocol Security (IPSec) connection in order to transact data over a virtual private network (VPN). However, an iSCSI machine is usually a computer system that has a limited operating system (OS). Having a computer system with a limited OS negotiating and configuring an IPSec connection may not be very effective.

Consequently, what is needed is an apparatus, system and method of having a computer system with a more-complete-OS handle the IPSec connection negotiations with an iSCSI initiator.

SUMMARY OF THE INVENTION

The present invention provides a method, system and apparatus for negotiating parameters for an IPSec connection between a requesting client and an iSCSI system using a computer system other than an iSCSI system. By design, the iSCSI system monitors TCP (Transmission Control protocol) port 500 for secure requests. Port 500 is an official port number assigned for IPsec tunnel negotiations. When a request enters port 500, the iSCSI system transmits all information received on port 500 to a computer system better suited to handle IPSec parameter negotiations. After the computer system has negotiated the parameters, the parameters are passed to the iSCSI system for a secure data transaction to ensue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
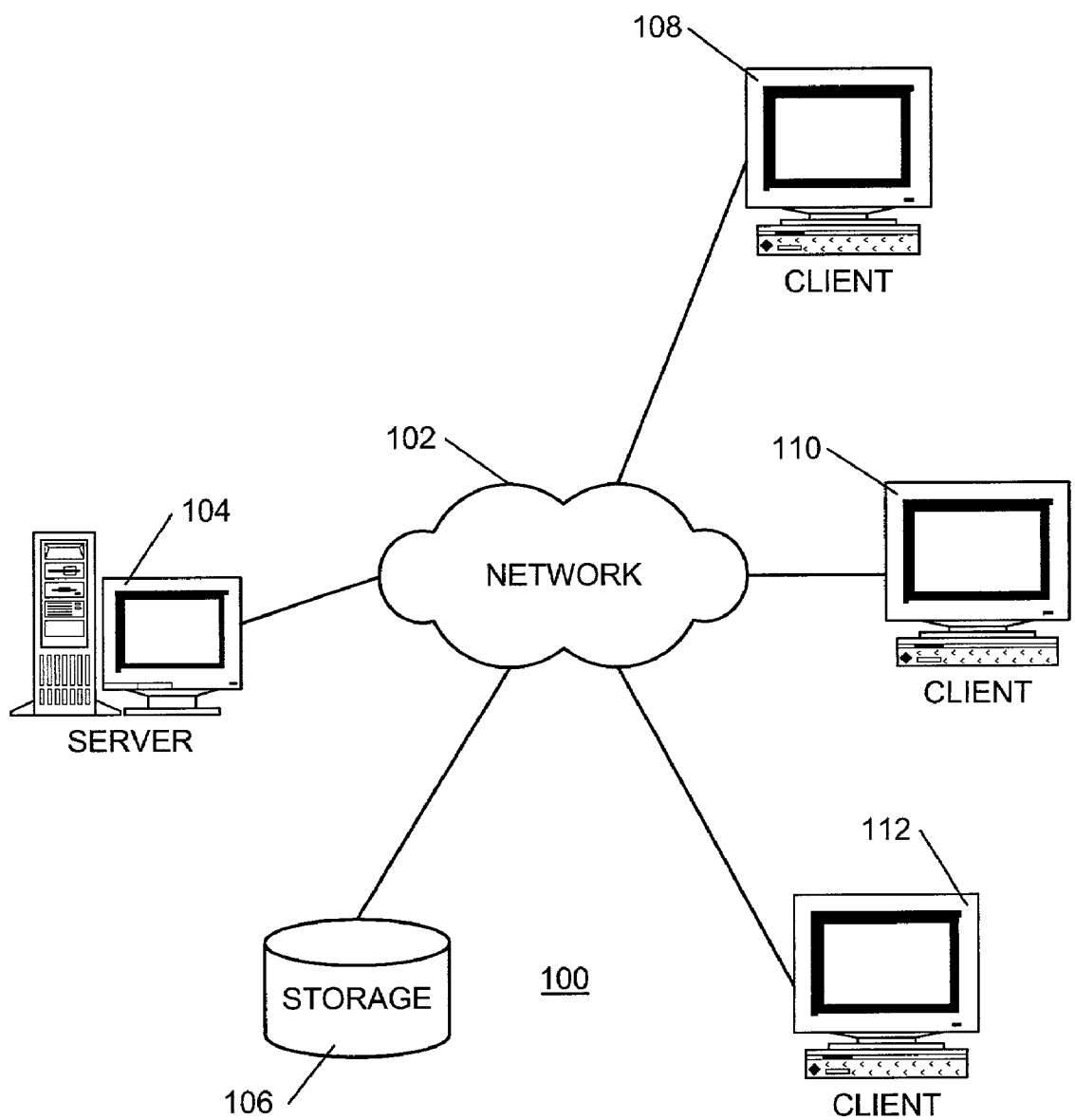
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
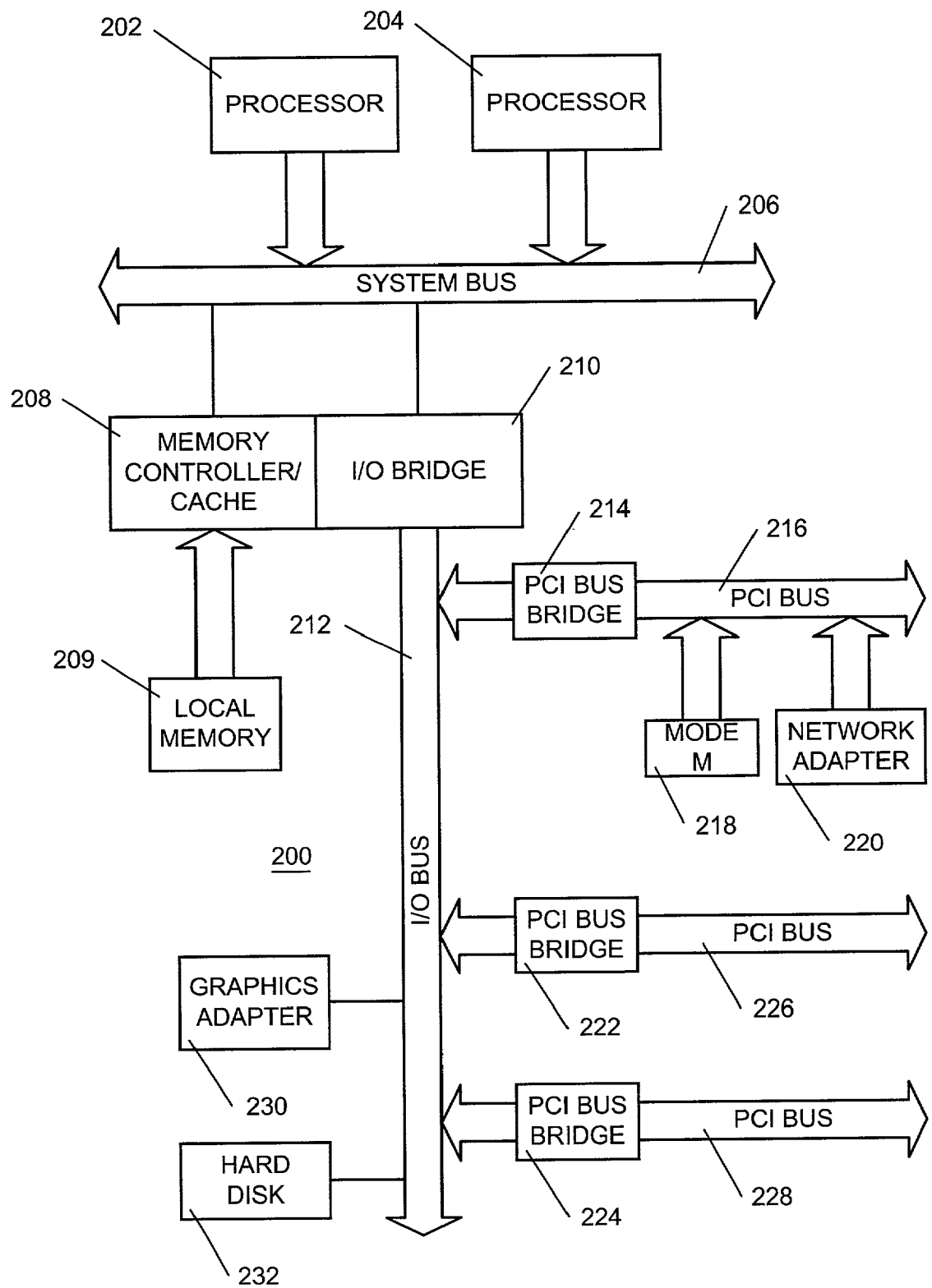
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
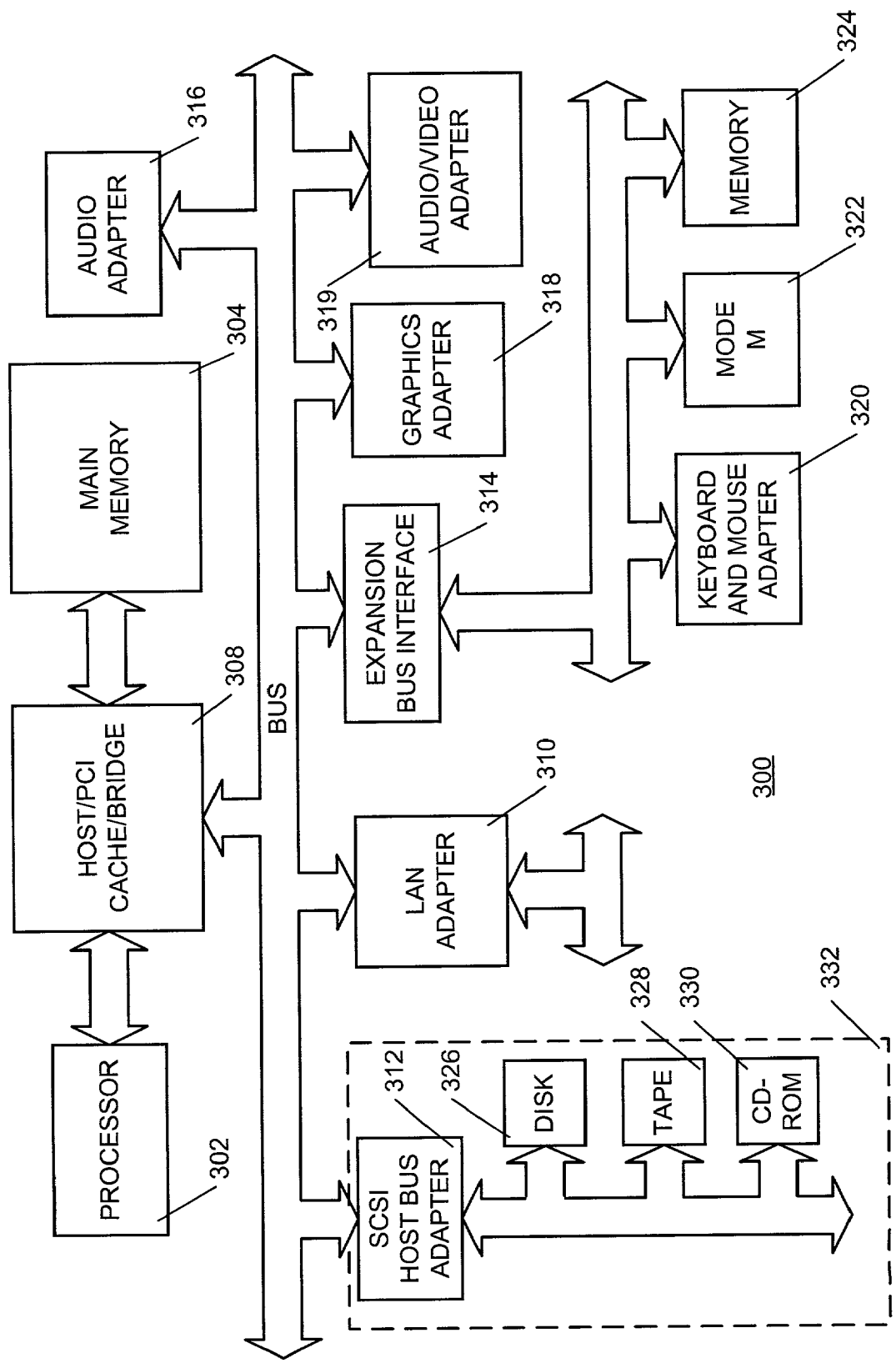
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of having a computer system with full OS handle an IPSec connection negotiation with an iSCSI initiator and to have the iSCSI machine handle data transactions with the initiator. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
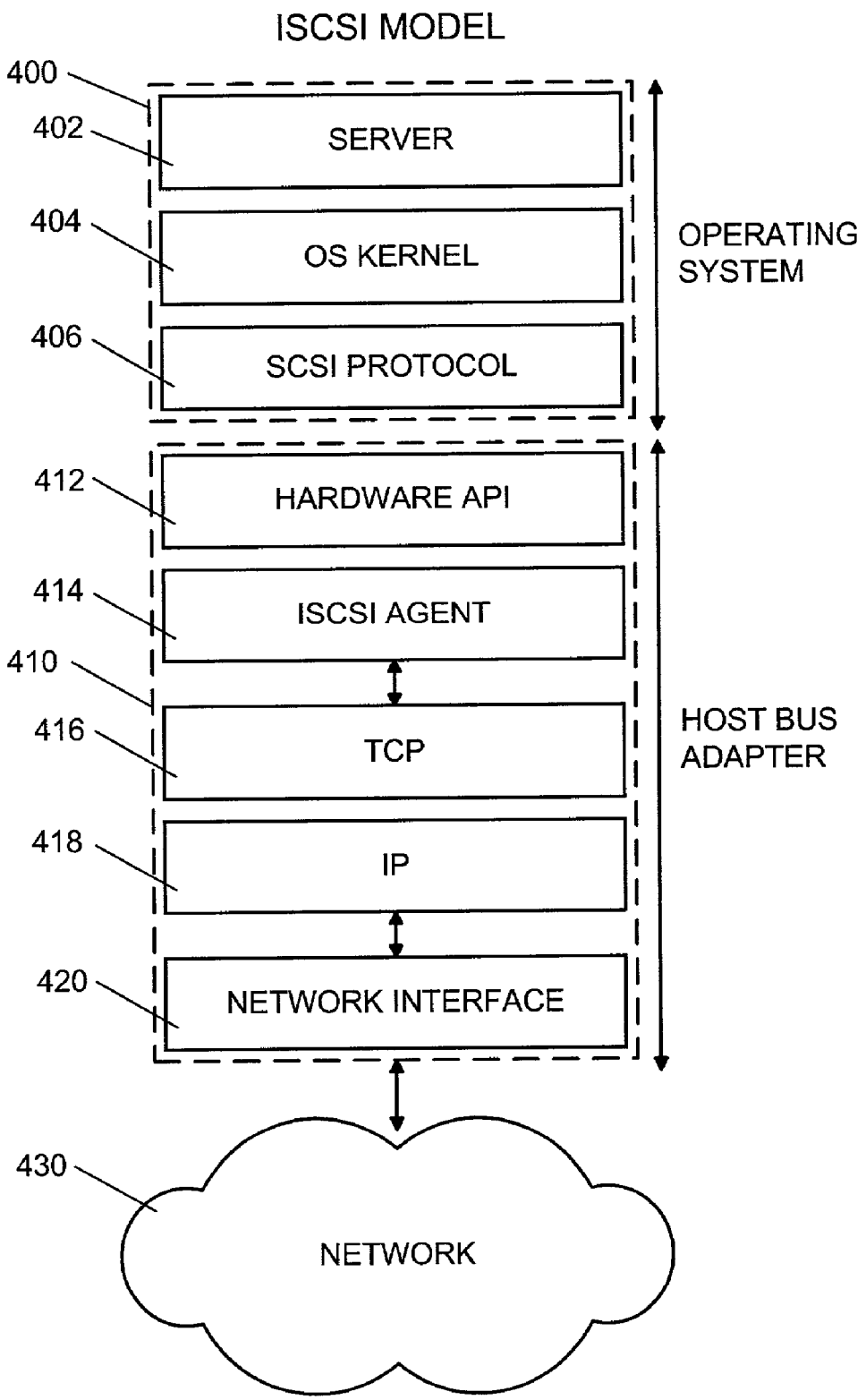
FIG. 4 depicts a system incorporating an iCSCI subsystem.

FIG. 4 depicts a system incorporating an iCSCI protocol. Operating system 400 and host bus adapter 401 make up the system. Operating system 400 is made up of server 402, kernel 404 and SCSI protocol 606. Host bus adapter 410 contains hardware API (application program interface) 412, iSCSI agent 414, TCP stack 416, IP stack 418 and network interface 420. Network interface 420 may be an Intel® PRO 100S Dual Port Server Adapter. This adapter comprises an embedded processor and firmware that provide IPSec encryption and decryption service to the host to which it is attached. This offloads the iSCSI machine from the performance degrading encryption and decryption task since it is handled by the adapter.

However, the adapter does not perform IKE negotiations needed for IPSec connection. Thus, before the adapter is able to provide IPSec encryption/decryption services to the iSCSI machine, certain parameters must first be negotiated between the client and the iSCSI machine. For example, the client and the iSCSI device must share a public key. This is accomplished through a protocol known as Internet Security Association and Key Management Protocol/Oakley (ISAKMP/Oakley), which allows the receiver to obtain a public key and authenticate the sender using digital certificates.

A digital certificate is an attachment to an electronic message used for security purposes. The most common use of a digital certificate is to verify that a user sending a message is who he or she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet. The recipient of an encrypted message uses the CA's public key to decode the digital certificate attached to the message, verifies it as issued by the CA and then obtains the sender's public key and identification information held within the certificate. With this information, the recipient can send an encrypted reply.

A CA is a trusted third-party organization or company that issues digital certificates used to create digital signatures and public-private key pairs. The role of the CA is to guarantee that the individual granted the unique certificate is, in fact, who he or she claims to be. Usually, this means that the CA has an arrangement with a financial institution, such as a credit card company, which provides it with information to confirm an individual's claimed identity. CAs are a critical component in data security and electronic commerce because they guarantee that the two parties exchanging information are really who they claim to be.

The present invention uses a computer system with a more-complete-OS to provide IPSec administrative support to the iSCSI target. Specifically, the computer system with the more-complete-OS handle all IPSec handshakes used to obtain public keys and to authenticate initiators etc. Once authentication is established and a public key is obtained, the computer system with the more-complete-OS passes the required information to the iSCSI machine where the adapter can encrypt and decrypt iSCSI packets.

Figure 5:
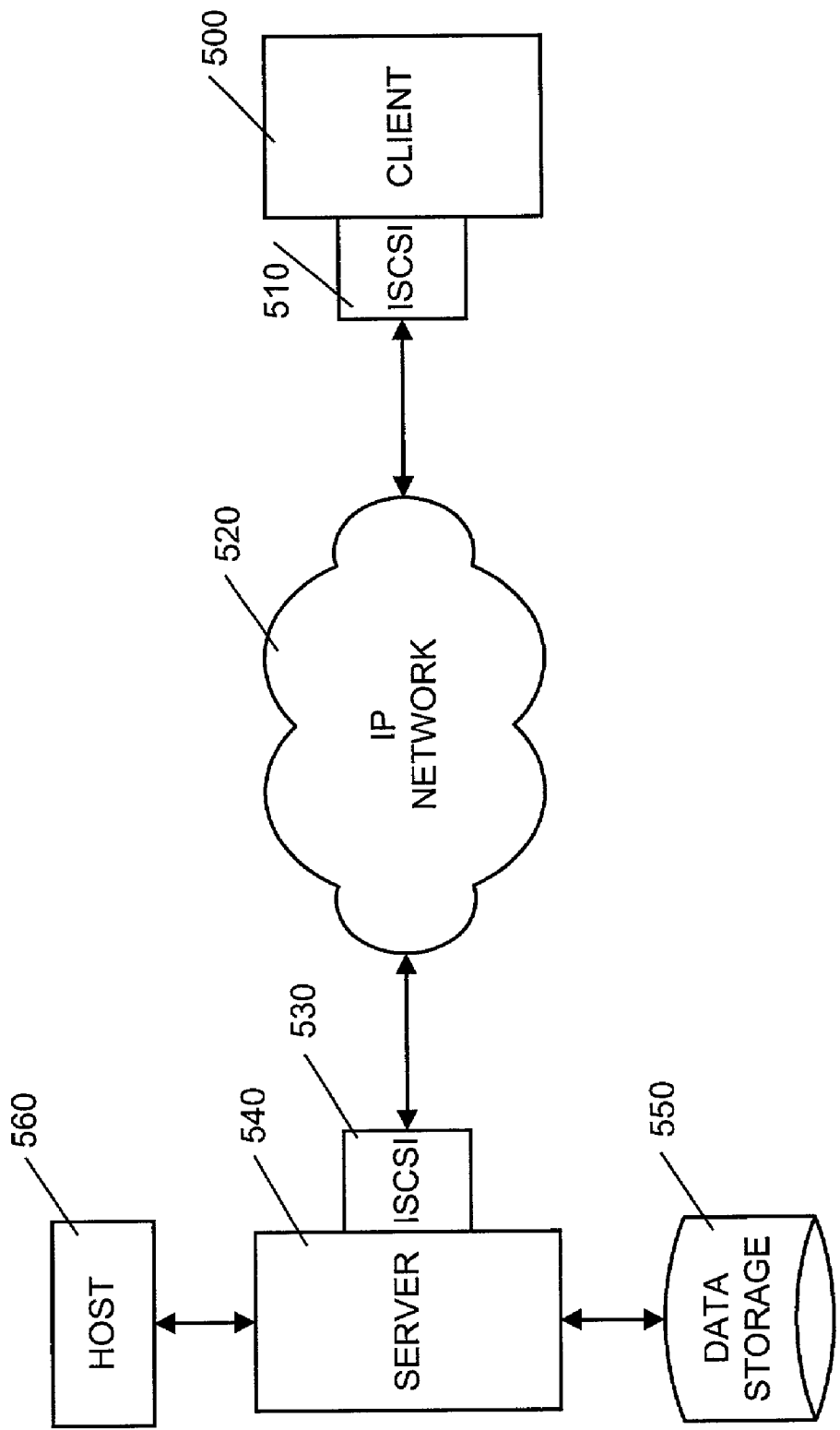
FIG. 5 illustrates an iSCSI network using the present invention.

FIG. 5 illustrates an iSCSI network using the present invention. The iSCSI network includes a client system 500 with its iSCSI stack 510 connected to a server 540 through an IP network 520 and the server's iSCSI stack 530. The server is connected to data storage 550 and to host system 560. The server 540, iSCSI stack 530 and data storage 550 make up the iSCSI target. The host system 560 is the computer system with the more-complete-OS and may be connected to the server 540 using a leased line. A leased line would ensure the security required during the IPSec negotiations. Note that the invention is not restricted to using a leased line, any other medium to connect the two machines together may be used, including the Internet. Note also that the host 560 may provide IPSec negotiation services to more than one iSCSI target.

When the client 500 initiates a login procedure (this is usually done using TCP port 500), the server 540 forwards the request to host 560. Host 560 then negotiates the IPSec security connection with the client 500. Host 560 uses the Internet Key Exchange (IKE) protocol to negotiate a Security Association (SA) with the client. When the IKE negotiation is successfully completed, a Transform corresponding to this particular SA is created. The transform is a superset of the SA parameters and includes a Security Parameter Index, an IP destination Address, a Security Protocol and cryptographic algorithms. The transform is a piece of information needed to enable the IPsec chip set on the network adapter of the target.

Figure 6:
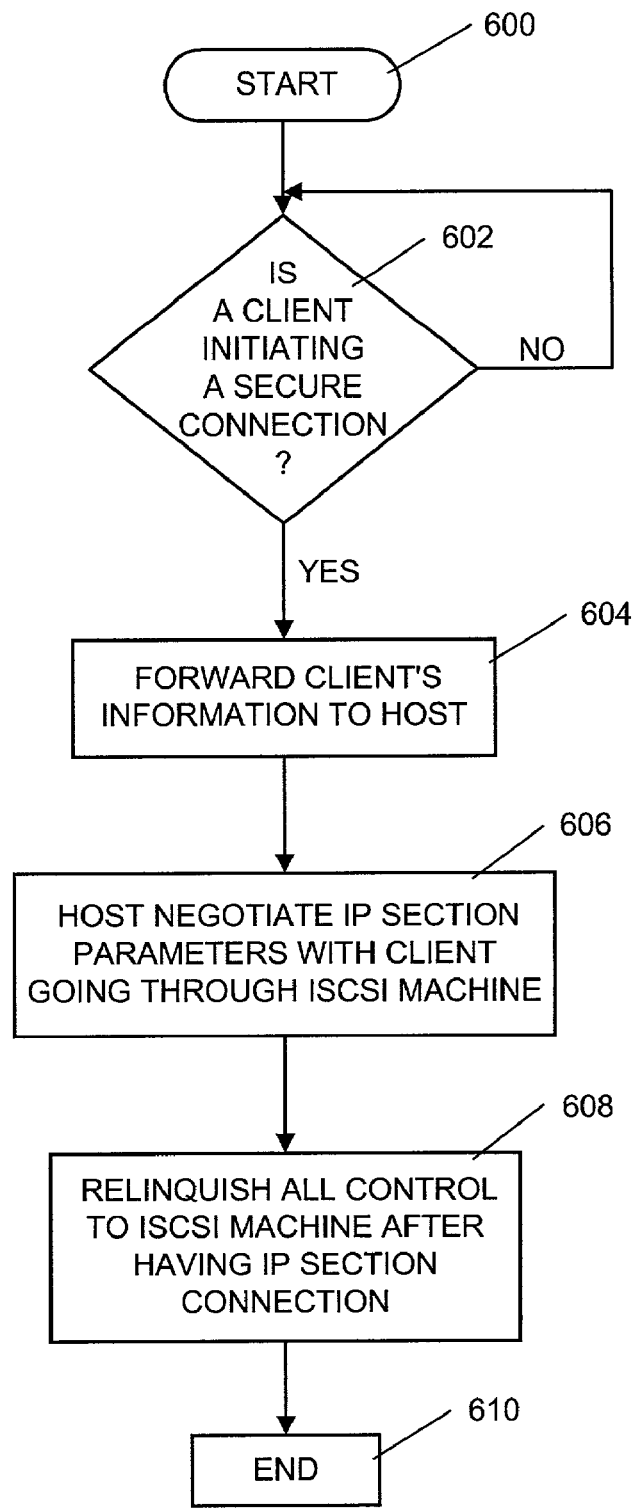
FIG. 6 depicts a flow chart of a process that may be used with the invention.

Once host 560 completes the IKE exchange and creates the transform, it passes the transform to the target's IPsec network adapter. The network adapter loads the transform and encodes and decodes all network traffic to and from the client accordingly FIG. 6 is a flow chart of a process that may be used with the invention. The process starts when a client initiates an IPSec login through TCP port 500. All the client's information is forwarded to the host with the more complete OS. The host then negotiates all the IPSec parameters with the client. Once this is completed, control is passed back to the iSCSI machine so that secure data transaction may ensue.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transacting data over a secure network connection between an iSCSI system and a client system, the iSCSI system including a host system and an SCSI machine, the method comprising the steps of:

receiving from said client system, by said iCSCI machine, a request for a secure connection to transact the data;

forwarding, by said iSCSI machine, said request to said host system, said host system being used for negotiating parameters of the secure connection with the client system; and passing, by said host system, the negotiated parameters of the secure connection to the iSCSI machine such that the iSCSI machine and the client system can transact data over the secure connection without further help from the host system.

2. The method of claim 1 wherein one of the parameters is an encryption/decryption key.

3. The method of claim 2 wherein the iSCSI includes a network adapter, the network adapter using the encryption/decryption key for encrypting/decrypting the data.

4. The method of claim 3 wherein the request for the secure connection is received at TCP (Transmission Control Protocol) port 500.

5. The method of claim 4 wherein the request for the secure connection is a login request.

6. A computer program product on a computer readable medium for transacting data over a secure network connection between an iSCSI system and a client system, the iSCSI system including a host system and an iSCSI machine, the computer program product comprising:

code means for receiving from said client system, by said iCSCI machine, a request for a secure connection to transact the data;

code means for forwarding, by said iSCSI machine, said request to said host system, said host system being used for negotiating parameters of the secure connection with the client system; and code means for passing, by said host system, the negotiated parameters of the secure connection to the iSCSI machine such that the iSCSI machine and the client system can transact data over the secure connection without further help from the host system.

7. The computer program product of claim 6 wherein one of the parameters is an encryption/decryption key.

8. The computer program product of claim 7 wherein the iSCSI includes a network adapter, the network adapter using the encryption/decryption key for encrypting/decrypting the data.

9. The computer program product of claim 8 wherein the request for the secure connection is received at TCP (Transmission Control Protocol) port 500.

10. The computer program product of claim 9 wherein the request for the secure connection is a login request.

11. An apparatus for transacting data over a secure network connection with a client system, the apparatus including a host system and an iSCSI machine, the apparatus comprising:

means for receiving from said client system, by said iCSCI machine, a request for a secure connection to transact the data;

means for forwarding, by said iSCSI machine, said request to said host system, said host system being used for negotiating parameters of the secure connection with the client system; and means for passing, by said host system, the negotiated parameters of the secure connection to the iSCSI machine such that the iSCSI machine and the client system can transact data over the secure connection without further help from the host system.

12. The apparatus of claim 11 wherein one of the parameters is an encryption/decryption key.

13. The apparatus of claim 12 wherein the iSCSI includes a network adapter, the network adapter using the encryption/decryption key for encrypting/decrypting the data.

14. The apparatus of claim 13 wherein the request for the secure connection is received at TCP (Transmission Control Protocol) port 500.

15. The apparatus of claim 14 wherein the request for the secure connection is a login request.

16. An iSCSI system for transacting data over a secure network connection with a client system, the iSCSI system including a host system and an iSCSI machine, the iSCSI system comprising:

at least one storage system for storing code data; and at least one processor for processing the code data to receive from said client system, by said iCSCI machine, a request for a secure connection to transact the data, to forward, by said iSCSI machine, said request to said host system, said host system being used for negotiating parameters of the secure connection with the client system, and to pass, by said host system, the negotiated parameters of the secure connection to the iSCSI machine such that the iSCSI machine and the client system can transact data over the secure connection without further help from the host system.

17. The computer system of claim 16 wherein one of the parameters is an encryption/decryption key.

18. The computer system of claim 17 wherein the iSCSI includes a network adapter, the network adapter using the encryption/decryption key for encrypting/decrypting the data.

19. The computer system of claim 18 wherein the request for the secure connection is received at TCP (Transmission Control Protocol) port 500.

20. The computer system of claim 19 wherein the request for the secure connection is a login request.

* * * * *